United States Patent [19]
Ito et al.

[11] Patent Number: 5,342,013
[45] Date of Patent: Aug. 30, 1994

[54] SEAT SLIDING DEVICE FOR VEHICLE

[75] Inventors: Sadao Ito, Anjo; Hiroshi Nawa, Kariya, both of Japan

[73] Assignee: Aisin Seiki Kabushiki Kaisha, Kariya, Japan

[21] Appl. No.: 68,528

[22] Filed: May 28, 1993

[30] Foreign Application Priority Data

May 29, 1992 [JP] Japan ................... 4-138719

[51] Int. Cl.⁵ .............................. F16M 13/00
[52] U.S. Cl. ...................... 248/429; 248/424
[58] Field of Search ............ 248/429, 430, 419, 424, 248/420; 74/425; 297/346, 340; 296/65.1

[56] References Cited

U.S. PATENT DOCUMENTS

| | | | |
|---|---|---|---|
| 4,805,866 | 2/1989 | Aihara | 297/346 X |
| 4,863,209 | 9/1989 | Deegener | 248/429 X |
| 4,907,776 | 3/1990 | Nemoto | 248/430 |
| 4,919,370 | 4/1990 | Martin | 248/73 |
| 4,969,622 | 11/1990 | Munchow | 296/65.1 X |
| 5,121,895 | 6/1992 | Ikegaya et al. | |
| 5,150,872 | 9/1992 | Isomura | 74/425 X |
| 5,207,473 | 5/1993 | Nawa et al. | |
| 5,222,402 | 6/1993 | White | 74/89.14 |
| 5,224,749 | 7/1993 | Gauger | 248/429 |

FOREIGN PATENT DOCUMENTS

| | | | |
|---|---|---|---|
| 0077538 | 4/1986 | Japan | 248/429 |
| 64-9043 | 1/1989 | Japan . | |

*Primary Examiner*—J. Franklin Foss
*Attorney, Agent, or Firm*—Finnegan, Henderson, Farabow, Garrett and Dunner

[57] ABSTRACT

A seat sliding device is comprised of a pair of laterally spaced lower rails for mounting on a vehicle body floor, each of the lower rails including a channel, a pair of upper rails adapted to carry a seat cushion, each of the upper rails being slidably mounted at an engaging portion to the corresponding lower rail, each of the upper rails having a channel which is positioned above the engaging portion, a screw shaft accommodated in one of the channels, a nut member screwing onto the screw shaft and secured to one of the upper and lower rails, and bearing member supporting rotatably the screw shaft and elastically fit within the channel of the other of the upper and lower rails.

10 Claims, 4 Drawing Sheets

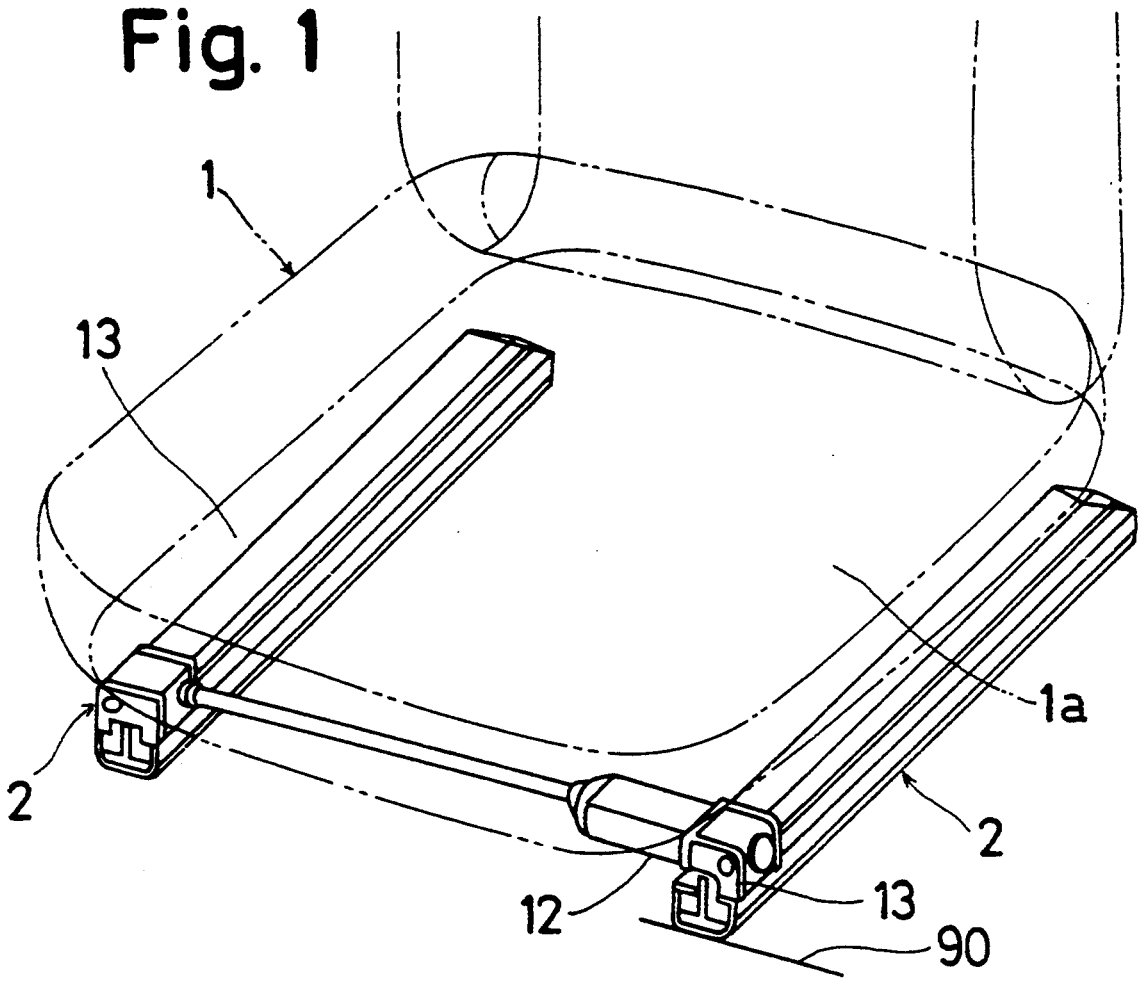
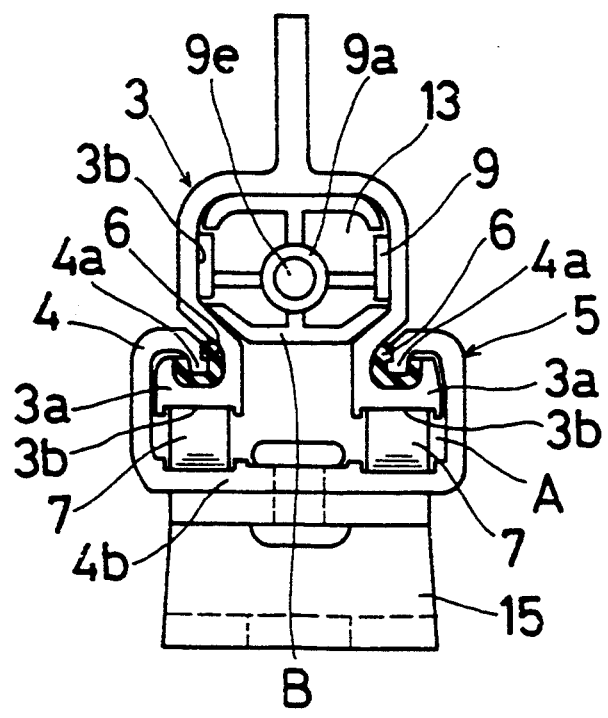

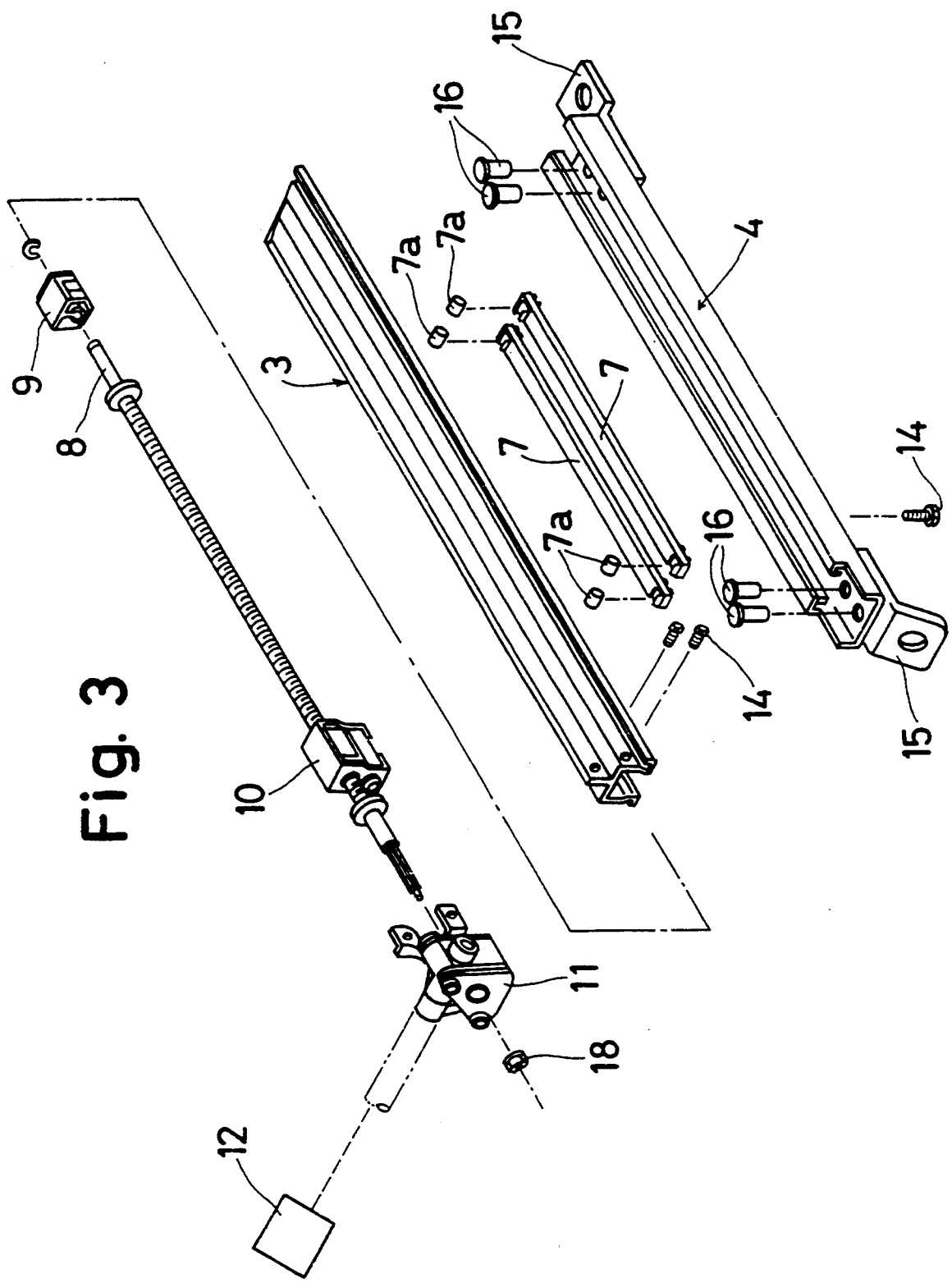

SEAT SLIDING DEVICE FOR VEHICLE

BACKGROUND OF THE INVENTION

1. Field of the Invention

The present invention relates to a seat sliding device for a vehicle.

2. Description of the Related Art

In Japanese Patent Application Laid-open Print No. 9043/ the 64th year of Showa (1989) which was published in 1989 without examination, a seat sliding device is disclosed for moving an upper rail along a lower rail, which includes a screw shaft accommodated in the lower rail, that is of a shallow U-shaped configuration. The screw shaft is rotatably supported at its opposite end portions by respective bearing members which are secured to the opposite ends of an inner surface of the upper rail. The lower rail is provided with a bearing member which screws onto the screw shaft. The screw shaft is connected to a driving mechanism in such a manner that upon actuation of the driving mechanism the screw shaft is rotated, and the resulting rotation moves the screw shaft together with the upper rail along the lower rail.

In the foregoing structure, each of the bearing members is secured to the upper rail by means of a pair of bolt members. Thus, a pair of corresponding holes through which the bolt members pass, are provided in the upper rail, which requires a cumbersome assembly operation. In addition, a head of each bolt member may interfere with a seat cushion, which is to be mounted on the upper rails.

SUMMARY OF THE INVENTION

It is, therefore, an object of the present invention to provide a seat sliding device for a vehicle without the foregoing drawbacks.

It is another object of the present invention to provide a seat sliding device for a vehicle in which no bolt member is required for securing a bearing member to an upper rail.

Additional features and advantages of the invention will be set forth in the description which follows, and in part will be apparent from the description, or may be learned by practice of the invention. The objectives and other advantages of the invention will be realized and attained by the method and system, particularly pointed out in the written description and claims hereof, as well as the appended drawings.

To achieve these objects, and other advantages, and in accordance with the invention as broadly described, there is provided a seat sliding device for a vehicle which comprises a pair of laterally spaced lower rails for mounting on a vehicle body floor, each of the lower rails includes a channel, a pair of upper rails adapted to carry a seat cushion, each of the upper rails being slidably mounted at an engaging portion to the corresponding lower rail. Each of the upper rails have a channel which is above the engaging portion. A screw shaft is accommodated in one of the channels. A nut member is screwed onto the screw shaft and is secured to one of the upper and lower rails, and a bearing member rotatably supports the screw shaft and elastically fits in the channel of the other of the upper and lower rails.

BRIEF DESCRIPTION OF THE DRAWINGS

Additional objects and advantages of the present invention will become apparent from the following detailed description of the preferred embodiments when considered in connection with the attached drawings, in which:

FIG. 1 is a perspective view of a seat apparatus provided with a seat sliding device in accordance with the present invention;

FIG. 3 is an exploded perspective view of the seat sliding device of FIG. 2;

FIG. 4 is a cross-sectional view taken along line C—C in FIG. 2;

DESCRIPTION OF THE PREFERRED EMBODIMENTS

Figure 2:
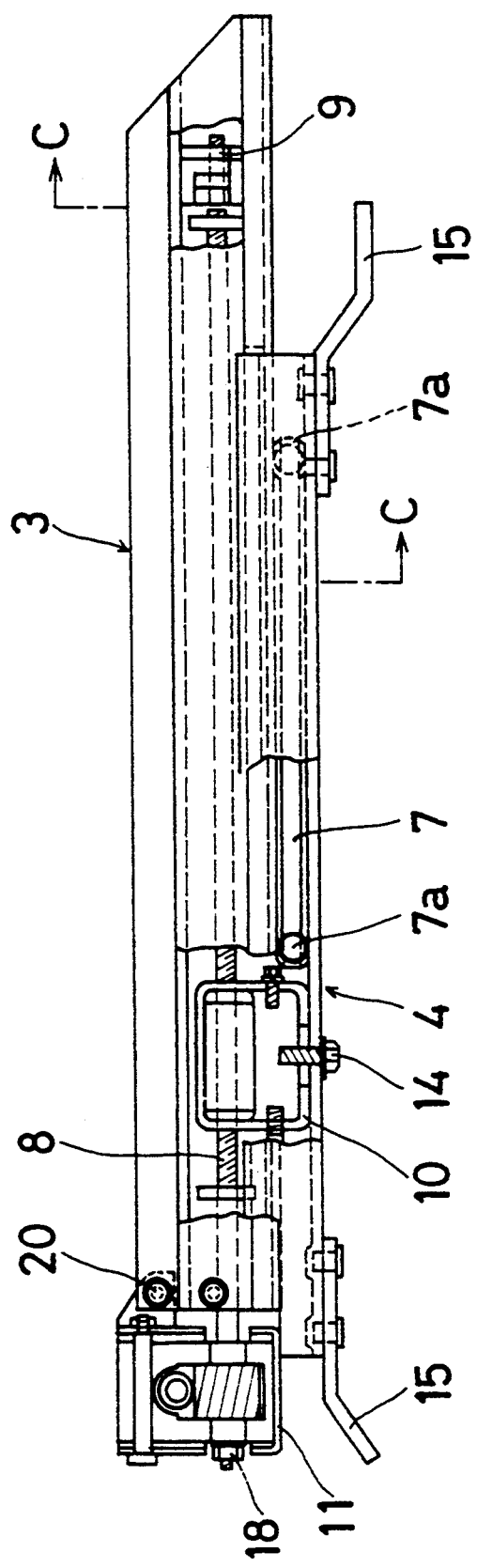
FIG. 2 is a side view of a seat sliding device with portions broken away to show the interior thereof in accordance with the present invention.

Referring to FIGS. 1 and 4, a seat 1 includes a pair of rail assemblies 2 both of which are secured to a vehicle-body floor 90. The rail assemblies 2 each has an upper rail 3 which carries a seat-cushion 1a, and a lower rail 4 which is secured to the vehicle-body floor 90. The upper rail 3 is interlocked at an engaging portion 5 with the lower rail 4 which has a substantially U-shaped configuration in cross-section, with inner space or channel that is open at its top portion. Each leg or opposite side portion of the U-shaped lower rail 4 is bent toward each other into a substantial L-shaped configuration forming a bent base portion 4a, which extends inwardly and then downwardly in a direction toward the base of rail 4. The upper rail 3 is formed into a substantially inverted U-shaped configuration to define therein a channel or inner space B open in the downward direction. Each of the legs or opposite side portions of the U-shaped upper rail 3 is bent outwardly so as to form substantially L-shaped portions 3a, which extend in the upward direction adjacent one end of the outwardly extending bases of the L configuration. Each bent base portion 3a of the upper rail 3 is positioned within the inner space A of the lower rail 4, and is interlocked with a shoe member 6 which is secured to the downwardly extending end portion 4a of the lower rail 4, which results in the upper rail 3 being slidably supported by the lower rail 4. It is to be noted that the outwardly extending base portions 3a of the upper rail 3 and the bent base portion 4a of the lower rail 4 constitute the foregoing engaging portion 5. In addition, in order to enable a smooth movement of the upper rail 3 relative the lower rail 4, a roller assembly is disposed therebetween which includes a plurality of rollers 7a. The positioning of each roller 7A is established by fitting in a concave portion 3b of the bent base portion 3a of the upper rail 3.

The width of upper rail 3 has a narrow neck portion defined by the bent base portions 3a. In other words, a bottle neck portion is formed near the bent portion 3a. Thus, the upper rail 3 can be inserted easily into the inner space A of the lower rail 4. The inner space B of the upper rail 3 is positioned above the engaging portion 5.

As best shown in FIGS. 2 to 4 inclusive within each upper rail 3, there is positioned a screw shaft 8, a bearing member 9, a nut member 10, and a gear box 11. One end portion of the screw shaft 8 is operatively connected to a motor 12 via the gear box 11 which serves as a reducer. A nut member 18 is used for mounting one end portion of the screw shaft 8 to the gear box 11. The gear box 11 is secured to the upper rail 3 by means of a bolt member 20. The motor 12 and the gear box 11 constitute a driving mechanism or driving means.

Figure 5:
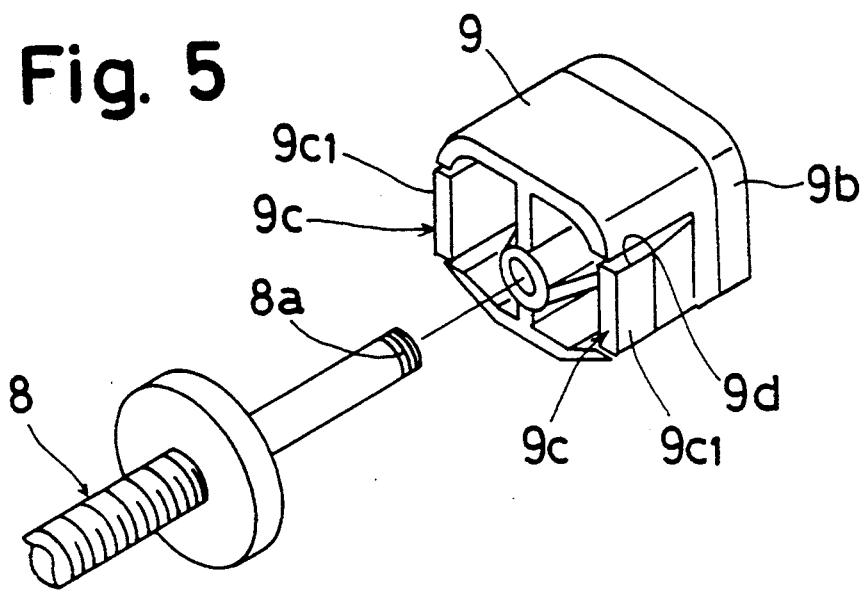
FIG. 5 is an exploded perspective view of a screw shaft and bearing member assembly of the device of the present invention.
Figure 6:
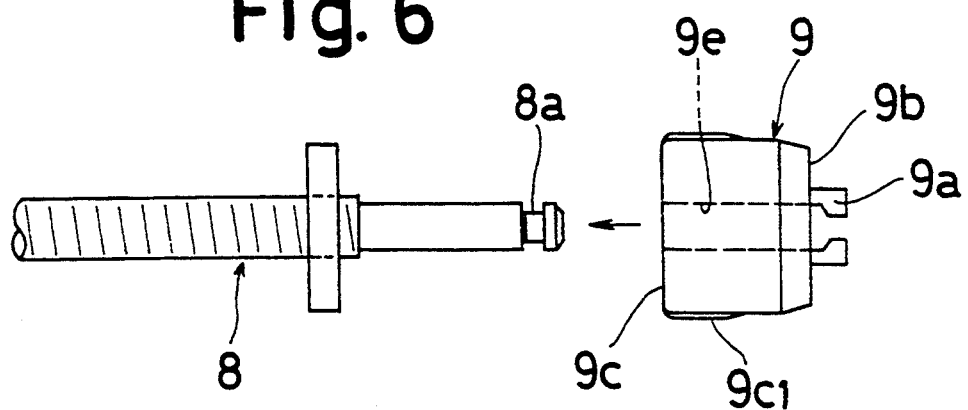
FIG. 6 is an exploded view of the screw shaft and bearing member illustrating how they connect to one another.

As best shown in FIGS. 5 and 6, the other end portion of the screw shaft 8 is formed with an annular groove 8a. The bearing member 9 is provided at its distal end portion with a pair of vertically spaced hooks 9a as viewed in the drawings. The bearing member 9 has therein a passage 9e which is coaxial with the space between the hooks 9a. Thus, after insertion of the screw shaft 8 into the passage 9e of the bearing member 9 by moving the bearing member 9 axially toward the screw shaft 8 at rest, the hooks 9a of the bearing member 9 extend into the annular groove 8a of the screw shaft 8. Thus, the screw shaft 8 is rotatably mounted to the bearing member 9 without being removable from the bearing member 9. The cross-section of the bearing member 9 is substantially identical to that of the inner space B of the upper rail 3. However, a slight clearance exists in the horizontal direction in order to enable a smooth assembly of the screw shaft 8 into the bearing member 9. The height of the bearing member 9 is set to be slightly higher than that of the inner space B of the upper rail 3. However, each side portion 9c of the bearing member 9 is provided with a pair of vertically spaced grooves 9d, forming a guide portion 9cl. The guide portion 9cl is adapted to expand slightly with an elasticity toward the screw shaft 8 (FIG. 6). Thus, as shown in FIG. 3, the screw shaft 8 is arranged to be positioned within the upper rail 3 under the condition that the screw shaft 8 is connected at its opposite end portions with the nut member 10 and the bearing member 9, respectively. The insertion of the bearing member 9 into the respective upper rail 3 can be accomplished in a smooth manner by the slightly tapered elastic guide portion 9cl of the bearing member 9. In addition, after assembly of the screw shaft 8 into the upper rail 3, each of the elastic side portions 9c of the bearing member 9 enables elastic engagement of the bearing member 9 with an inner side wall of the upper rail 3 as best shown in FIG. 4. Thus, a stable location or accommodation of the bearing member 9 within the upper rail 3 is established.

Referring again to FIGS. 2 and 3, the nut member 10 is fixedly mounted to lower rail 4 by means of a bolt member 14 so that the nut member 10 is prevented from being rotated. The nut member 14 screws onto the screw shaft 8. The lower rail 4 is secured to an anchor 15 which is fixedly mounted to the vehicle-body floor 90 by means of plural rivets 16.

In operation, when the motor 12 is turned on, the resulting rotation is transmitted, via the bear box 11, to the screw shaft 8, which results in rotation of the screw shaft. Due to the fact that the nut member 10 screwing onto the screw shaft 8, remains in its fixed position on the lower rail 4, upon rotation of the screw shaft 8, the screw shaft 8 is caused to move together with the upper rail 3 relative to the lower rail 4. Thus, the seat position is adjusted in the vehicle-body in a lengthwise direction.

As can be easily understood that in order to mount the bearing member no bolt members are required.

Figure 7:
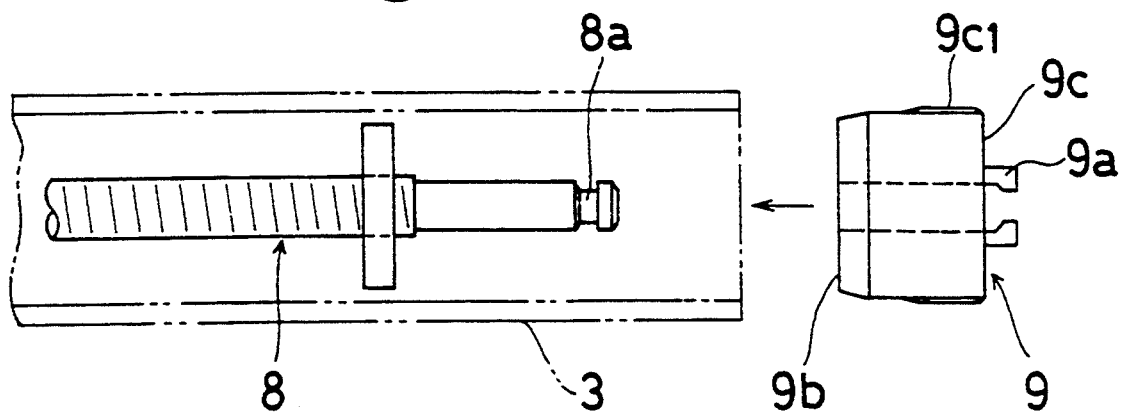
FIG. 7 is an exploded view showing an arrangement for connecting a bearing and screw shaft of the device of the present invention within one of the rails.

As shown in FIG. 7, the bearing member 9 can be mounted in the upper rail 3 in which the screw shaft 8 has been accommodated previously. In this manner, for easy insertion of the bearing member 9 the guide portion 9cl is expanded slightly away from the upper rail 3.

The principles, preferred embodiment, and mode of operation of the present invention have been described in the foregoing description. The invention which is intended to be protected herein should not, however, be construed as limited to the particular forms disclosed, as these are to be regarded as illustrative rather than restrictive. Variations and changes may be made by those skilled in the art without departing from the spirit of the present invention. Accordingly, the foregoing detailed description should be considered exemplary in nature and not limited to the scope and spirit of the invention as set forth in the appended claims.

What is claimed:

1. A seat sliding device comprising:
   a pair of laterally spaced lower rails for mounting on a vehicle body floor, each of the lower rails having sidewalls defining a channel;
   a pair of upper rails adapted to carry a seat cushion, each of the upper rails being slidably mounted at an engaging portion to a corresponding one of the spaced lower rails, each of the upper rails having sidewalls defining a channel therebetween above the engaging portion;
   a screw shaft positioned in one of the channels;
   a nut member threadably mounted to the screw shaft and secured to one of the upper and lower rails; and
   a bearing member supporting rotatably the screw shaft, the bearing member being elastically fit and frictionally engaging the sidewalls within the channel of the other of the upper and lower rails to secure the bearing member to said other of the upper and lower rails.

2. The seat sliding device of claim 1, wherein the bearing member and the nut member are within the channels of the upper and lower rail, respectively.

3. The seat sliding device of claim 1, wherein the channel of the upper rail has a narrow neck toward the lower rail for receiving the bearing member.

4. The sliding device of claim 1, wherein the bearing member has opposite elastic side portions, each opposite elastic side portion extending outwardly and defined by a pair of vertically spaced slits.

5. The seat sliding device of claim 1 wherein the one end of the screw shaft has an annular groove, and the bearing member includes a pair of hooks engagable in said grooves upon frictionally sliding the bearing member, axially in the channel to fix the screw shaft to the bearing member.

6. The seat sliding device of claim 1 wherein the configuration in cross section of the bearing member and the channel correspond to one another.

7. A seat sliding device for a vehicle, comprising
   an upper rail for supporting a seat and having downwardly depending first side portions spaced a first distance apart, narrowing to a neck portion having downwardly depending second side portions spaced a second distance apart, the second distance being less than the first distance, the second side portions ending in first end portions, the first side portions and the neck portion defining a first channel, the first channel being open at one end;

a lower rail for securing to a floor of the vehicle, the lower rail including upwardly projecting side portions with second ends, the neck portion of the upper rail extending between the second ends, the first ends being interlocked with the second ends at an interlocked portion for slidable movement of the upper rail with respect to the lower rail, the side portions of the lower rail and the interlocked portion defining a second channel with the first channel positioned above the interlocked portion;

a screw shaft, having opposite ends, located in the channel of the upper rail, a nut threadably connected to the screw shaft in the first channel intermediate the opposite ends and fixedly attached to the lower rail;

a motor coupled to a first of the opposite ends of the screw shaft for rotating the shaft relative the nut; and a bearing member insertable through the open end of the first channel and slidable in the first channel to a position in engagement with and rotatably supporting the screw shaft at a second of the opposite ends, the bearing member having first external portions frictionally engaging the downwardly depending first side portions to fixedly position the bearing in the upper rail.

8. The seat sliding device of claim 7 wherein the bearing member comprises second external portions frictionally engaging the upper rail between the first side portions and frictionally engaging the second side portions.

9. The seat sliding device of claim 7 wherein the screw shaft includes an annular shoulder at the second opposite end, and the bearing member includes a pair of spaced hooks engaging the shoulder to fix the axial position of the screwshaft relative to the bearing member.

10. The seat sliding device of claim 7 wherein the first external portions comprise outwardly extending elastic portions defined vertically spaced slits in the bearing member.

* * * * *